United States Patent [19]
Schenk, Jr. et al.

[11] 3,909,300
[45] Sept. 30, 1975

[54] POSITIVE SEAL FOR BATTERIES EMPLOYING PLASTIC CASINGS

[75] Inventors: Raymond L. Schenk, Jr., Doylestown, Pa.; William B. Hayes, Cinnaminson, N.J.

[73] Assignee: Gould Inc., St. Paul, Minn.

[22] Filed: Jan. 21, 1974

[21] Appl. No.: 435,166

[52] U.S. Cl. ............................ 136/134 R; 136/176
[51] Int. Cl. ............................................. H01m 1/02
[58] Field of Search ............ 136/135 S, 168, 134 R, 136/176; 29/498, 484

[56] References Cited
UNITED STATES PATENTS

| | | | |
|---|---|---|---|
| 1,263,500 | 4/1918 | Willard | 136/168 |
| 2,558,246 | 6/1951 | Gray | 136/168 |
| 2,972,655 | 2/1961 | Strauss | 136/168 |
| 3,706,126 | 12/1972 | Cushman | 29/498 |

*Primary Examiner*—Donald L. Walton
*Attorney, Agent, or Firm*—Wolfe, Hubbard, Leydig, Voit & Osann, Ltd.

[57] ABSTRACT

Methods and apparatus for positive displacement bonding and, more particularly, for automatically forming, on a continuous, reproducible basis, fusion bonds devoid of structural, electrical and cosmetic defects between two or more workpieces by moving a heated electrode into the area to be bonded so as to uniformly heat and melt the portions of the workpieces to be bonded while, at the same time, displacing substantially all of the molten material from the area to be bonded into a storage area or reservoir surrounding the heated electrode where such molten material is maintained in its uniformly heated molten state, and then retracting the electrode so as to permit the molten material to return to the cavity formed by the electrode in the workpieces where such molten material is allowed to cool and solidify, thus forming a flawless bond between the workpieces and, for doing so in the presence of an improved sealing means—thermal or fusion bonds are made in accordance with the methods of the invention and with the apparatus of the invention by a combination of 1) elevated temperature levels sufficient to melt the material to be bonded, and 2) displacement of the molten material; as contrasted with more conventional techniques and/or apparatus which combine elevated temperature levels and pressure.

9 Claims, 17 Drawing Figures

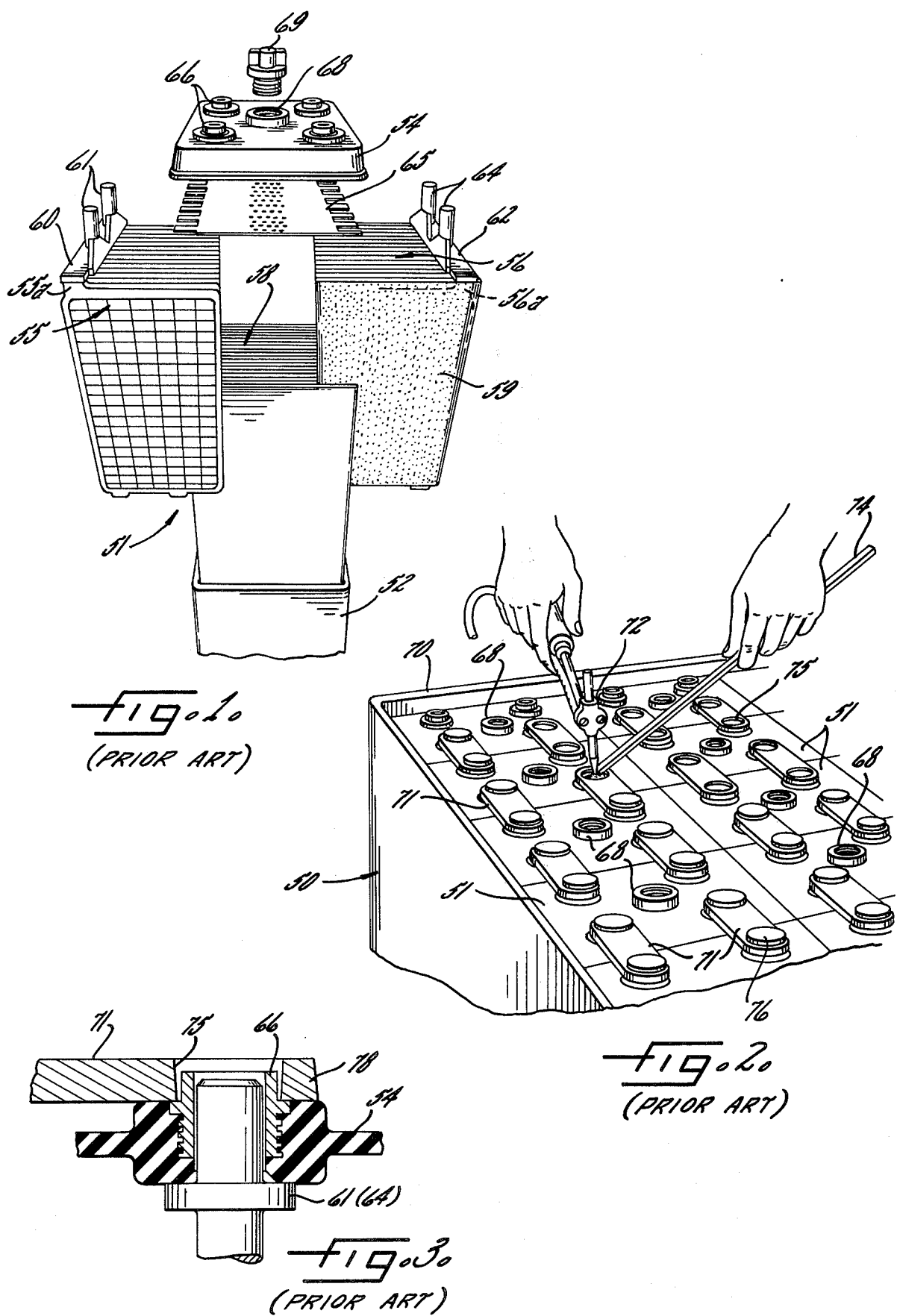

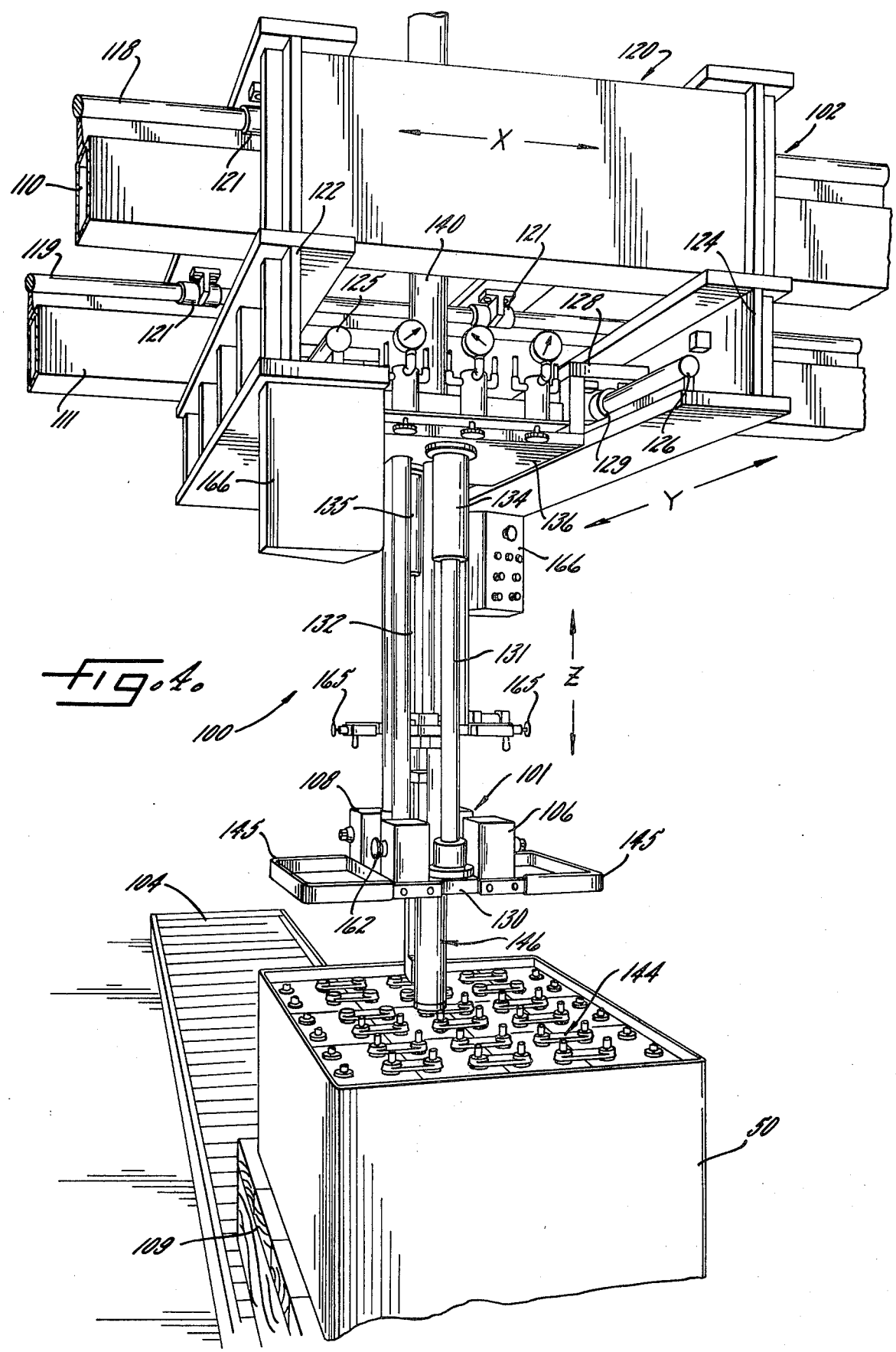

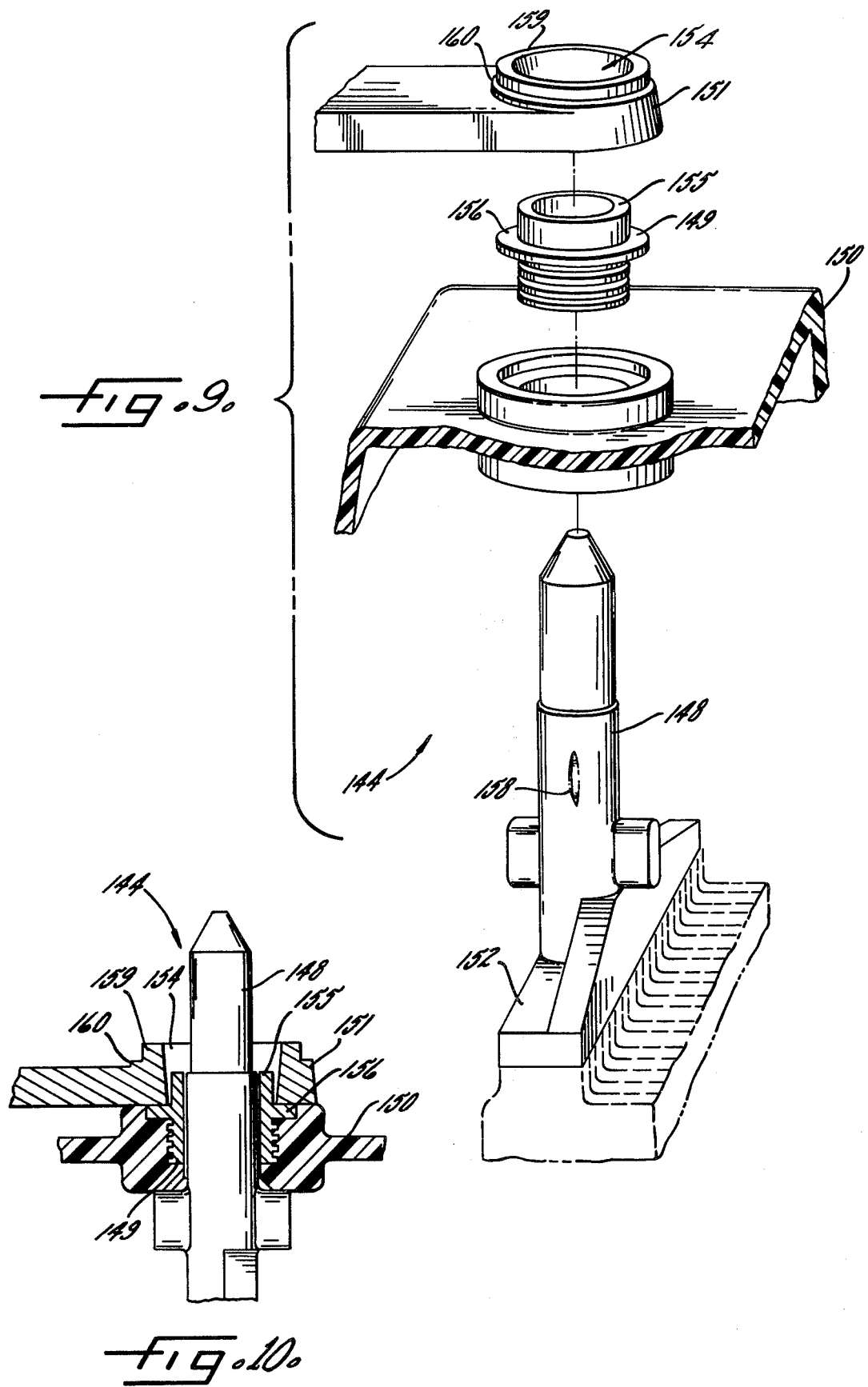

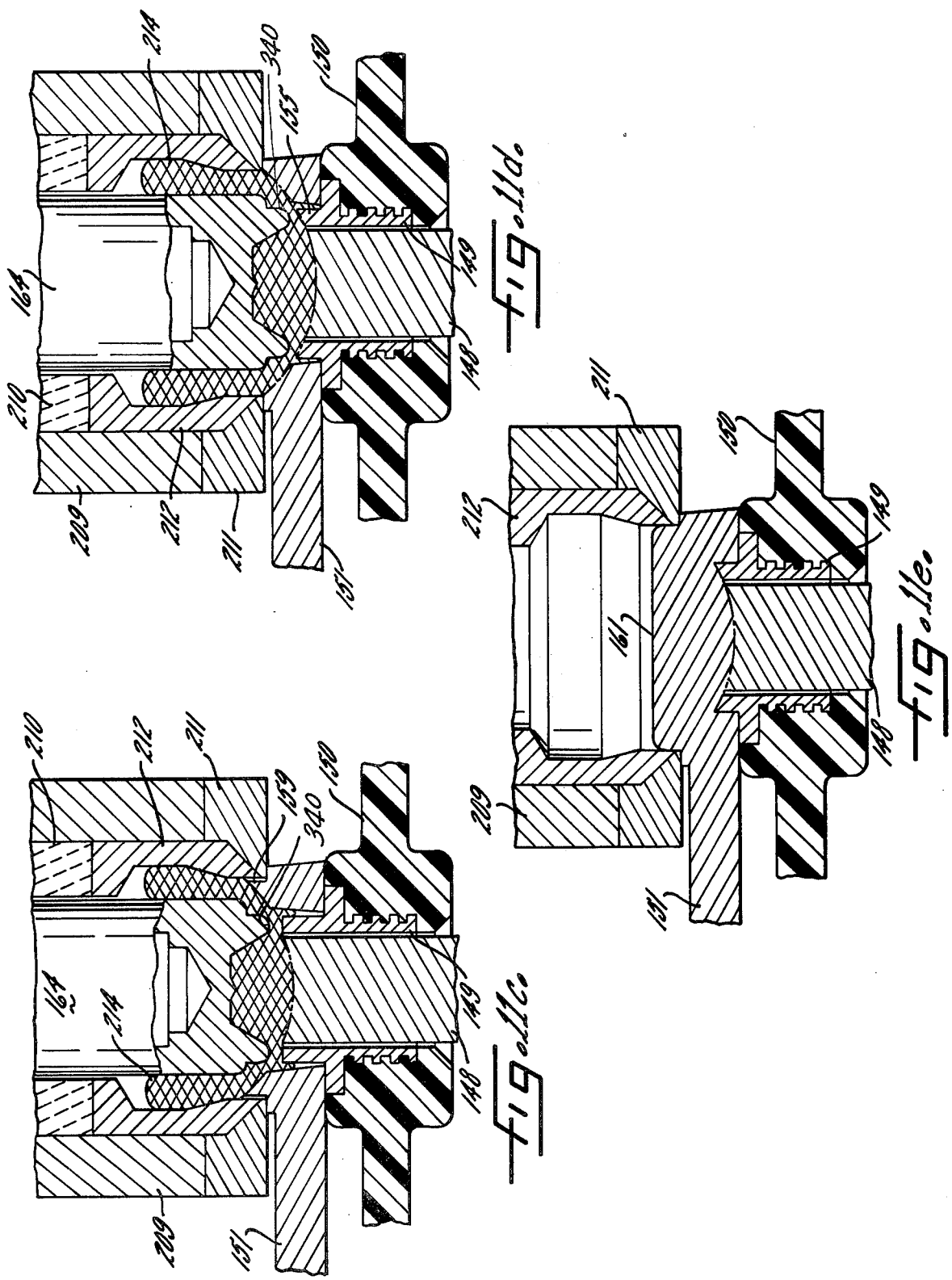

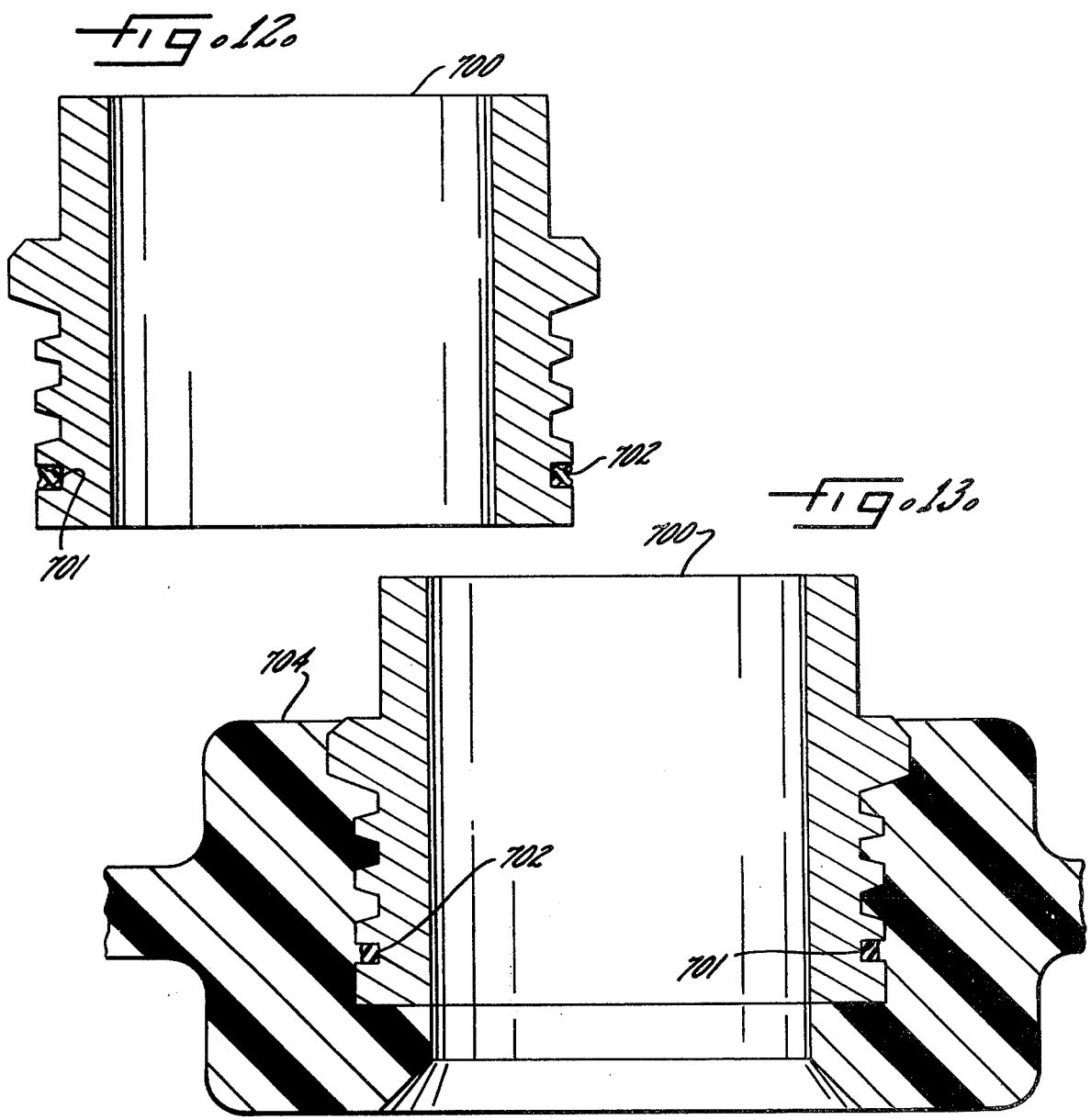

POSITIVE SEAL FOR BATTERIES EMPLOYING PLASTIC CASINGS

RELATED APPLICATIONS

Robert Holbrook Cushman, Ser. No. 435,157, filed Jan. 21, 1974.

Raymond L. Schenk, Jr., Ser. No. 435,178, filed Jan. 21, 1974.

Alan S. Keizer, Ser. No. 435,179, filed Jan. 21, 1974.

Robert Holbrook Cushman and Raymond L. Schenk, Jr., Ser. No. 435,169, filed Jan. 21, 1974.

Raymond L. Schenk, Jr. and Alan S. Keizer, Ser. No. 435,160, filed Jan. 21, 1974.

Raymond L. Schenk, Jr., Robert Holbrook Cushman and Alan S. Keizer, Ser. No. 435,180, filed Jan. 21, 1974.

Kurt R. Stirner and Robert Holbrook Cushman, Ser. No. 435,172, filed Jan. 21, 1974.

Raymond L. Schenk, Jr. and John A. Bruzas, Ser. No. 435,181, filed Jan. 21, 1974.

Raymond L. Schenk, Jr., John A. Bruzas and William E. Coville, Ser. No. 435,182, filed Jan. 21, 1974.

John A. Bruzas and William E. Coville, Ser. No. 435,156, filed Jan. 21, 1974.

BACKGROUND OF THE INVENTION

The present invention relates in general to fusion bonding or thermo bonding of two or more workpieces and, more particularly, to methods and apparatus characterized by their ability to automatically form, on a continuous, reproducible, high speed, production-line basis, fusion bonds devoid of structural, electrical and/or cosmetic defects between two or more workpieces by a technique hereinafter referred to as "positive displacement bonding." In its principal aspects, the invention is concerned with improved methods and apparatus for automatically moving a heated electrode through the portions of the workpiece(s) to be bonded so as to uniformly heat and melt those portions of the workpiece(s) to be bonded while, at the same time, displacing the molten material into a storage area or reservoir surrounding the heated electrode where such material is maintained in its uniformly heated molten state while further movement of the electrode into the workpiece(s) creates a cavity therein and, thereafter, retracting the heated electrode so as to permit the molten material to return to the cavity formed by the electrode in the workpiece(s) where such molten material is allowed to cool and solidify, thus forming a flawless bond between the workpieces and, at the same time, establishing an effective seal between the bonded parts and other components.

In recent years, there has been an ever increasing trend toward, and demand for, automation and mechanization in virtually all branches of industry. In many industries, typically including, but not limited to, the battery making industry, it is often necessary to bond two or more workpieces together to form a unitary assembly wherein the bond is characterized by its structural strength and/or, in some instances, by excellent characteristics of electrical conductivity. Various methods have been devised for bonding such workpieces together including, merely by way of example, welding, thermo-compression bonding, ultrasonic bonding, percussion welding, etc.

The particular technique selected has heretofore depended upon many variable parameters, including: 1) the sizes and/or shapes of the workpieces; and, 2) various characteristics of the particular materials to be bonded which may vary widely in such areas as electrical and/or thermal conductivity characteristics, melting points, etc. Moreover, the particular technique employed has often been dictated by physical limitations in access to the region where the bonds are to be effected. Merely by way of example, in the battery industry it is often necessary to bond two or more pieces of lead together at various points, in some cases internally and in others externally of a given battery cell. Lead, of course, is characterized by having a relatively low melting point on the order of only 630°F., as contrasted with, for example, steel which has a melting point on the order of 3,000°F. Moreover, where the lead workpieces comprise battery straps, plates, terminal posts and/or intercell connectors, such as commonly employed in industrial motive-power batteries, automotive batteries, and the like, it is often difficult to gain access to the parts to be bonded. Even where access can be obtained, one is normally limited in the amount of heat that can be applied and in the types of reducing agents that can be utilized by virtue of other components present in the area of the bond to be effected such, for example, as: the battery casing or cell jar which, in the automotive battery industry, is commonly made of rubber or plastic and in the industrial motive-power battery industry is normally made of impact resistant rubber; the electrolytic acids present in or to be added to the battery cells; the pasted positive and/or negative plates; the separators which are commonly made of microporous rubber; etc.

Many efforts have been made to devise improved bonding techniques which can be universally applied for the purpose of bonding two or more workpieces together irrespective of the wide range of variable parameters mentioned above. Moreover, consistent with the demands of industry today, numeous efforts have been made to devise bonding techniques which are capable of automation so as to enable automatic bonding of multiple workpieces as an integrated part of mass-production line and/or assembly line techniques. Typical of the aforementioned approaches are those described in U.S. Pat. Nos. 3,591,755, 3,608,809 and 3,706,126 of Robert Holbrook Cushman, assigned to the Western Electric Company, and relating to mechanical-thermal-pulse continuous fusion bonding processes and apparatus which are based, at least in part, upon a combination of applied and controlled pressure and temperature to effect a desired bond.

However, despite all such prior efforts which have met with varying degrees of success, certain industries have continued to employ the more tedious, time-consuming, manual bonding techniques which have been known and utilized for many years. Typical of these is the industrial motive-power battery industry where lead-to-lead bonds are still almost universally made by hand-torching or hand-burning techniques employing oxyacetylene torches and/or carbon burning tools. These techniques require highly skilled artisans who are capable of forming satisfactory bonds only after considerable training and, even then, a relatively high percentage of the bonds formed are not capable of meeting the rigorous quality control standards set by the battery industry. Typical of the types of difficulties encountered even by such skilled artisans are: 1) non-uniform heating of the interface between the parts to be bonded resulting in no bonding at all at some locations, and/or "burn-out" of connectors and/or other parts because of "over burning", thereby destroying the connector or other parts; 2) actual damage to and/or destruction of the rubber casing or battery cover due to inadvertent direct application of the flame or carbon tip thereto; 3) lack of control over, and resultant non-uniformity of the depth of, bond penetration into the parts to be bonded, thereby resulting in bonds which are unsatisfactory from either or both of structural and/or electrical conductivity characteristics; and 4) substantially complete melting of one of the two or more parts to be bonded accompanied by failure to melt the surface of a second of the pieces to be bonded, thereby resulting in a cold-knit between the properly and improperly melted pieces.

As a direct result of the inability of certain industries—for example, the industrial battery industry—to utilize the aforementioned known automatic and semi-automatic bonding systems, and the continued industry-wide reliance on hand-torching and/or hand-burning techniques, numerous disadvantages have continued to plague such industries. More specifically: 1) various industries, at great expense to themselves, have had to continue to attempt to train personnel in the difficult, time-consuming hand-torching or hand-burning techniques; 2) as a result of the relatively high heat generated by such techniques, the use of low melting point, economical, lightweight plastic battery casings has, at least in the industrial motive-power battery industry, often been precluded; 3) the percentage of batteries and/or battery cells rejected because of unsatisfactory bonds has remained high; and 4) the number of batteries which have passed rigorous quality control tests and/or procedures while having latent defects in the bonds has been unacceptably high, resulting in customer dissatisfaction because of the presence of "leakers", particularly in the battery post/intercell connector, as well as an extremely objectionable phenomenon known in the art as electro-capillary action wherein battery electrolyte is actually pumped out of the battery cell through minute passages passing through the positive battery post/connector interface where the bond is defective, thereby not only weakening the cell affected and decreasing its life and usefulness, but often creating a direct short which drains the battery and which often causes corrosion and irreparable damage to other equipment in the immediate area.

OBJECTS OF THE INVENTION

It is a general aim of the present invention to provide improved bonding methods and apparatus which overcome all of the foregoing disadvantages and which are characterized not only by their dependability and reliability in operation, but, also by their ability to continuously reproduce successive bonds having substantially identical characteristics and which meet the rigorous quality control standards set by the industry. More specifically, it is a principal aim of the invention to provide new and novel methods and apparatus for forming metal-to-metal bonds which, when applied to the battery making industry, substantially eliminate, if not completely eliminate, the danger of leakers and/or electro-capillary action resulting from non-uniform bonding of the battery post/intercell connector interface.

A more detailed general objective of the present invention is the provision of improved bonding methods and apparatus which are capable of bonding motive-power battery posts to intercell connectors with a high level of quality and repeatability, yet at reduced manufacturing costs.

In another of its more important aspects, it is an object of the present invention to provide improved bonding methods and apparatus which require only minimum operating temperatures for the bonding media, thereby minimizing energy expended and, at the same time, permitting the use of more economical, lightweight material—such, for example, as plastic—in the manufacture of industrial motive-power battery and/or cell casings, covers, etc., such materials having heretofore been unsuitable because of the high temperatures involved in conventional bonding techniques.

An important object of the present invention is the provision of an improved battery casing construction employing a positive seal between a molded plastic casing and the lead bushing molded therein through which the battery post passes.

These and other objects and advantages of the present invention will become more readily apparent upon reading the ensuing detailed description of the invention and upon reference to the attached drawings.

DESCRIPTION OF THE DRAWINGS

FIG. 1 is a fragmentary exploded perspective view, here illustrating the various components present in a conventional lead-acid storage battery cell of the type commonly manufactured today and for many years past in the industrial motive-power battery industry.

FIG. 2 is a fragmentary perspepctive view, here illustrating a conventional and well-known technique for bonding an intercell connector with the use of a hand-held carbon burning tool and a hand-held source of supplemental lead.

FIG. 3 is a vertical side elevation, partly in section, of a conventional battery cover, post, bushing and intercell connector assembly, here illustrating the parts prior to a hand-torching or hand-burning bonding operation.

FIG. 4 is a perspective view of a portion of a positive displacement bonding system suitable for use with the present invention, here illustrating an industrial motive-power battery disposed on a conveyor beneath a bonding head positioned to automatically effect a bond between a lead battery post of one battery cell and an intercell connector.

FIG. 9 is an exploded perspective view, here illustrating particularly the relationship between a typical battery cover, post, bushing and intercell connector.

FIG. 10 is an elevational view, partly in section, similar to FIG. 3, but here illustrating the various components of a battery post/intercell connector assembly, again depicting the parts prior to a bonding operation.

FIGS. 11a through 11e are fragmentary, enlarged, simplified, and somewhat diagramatic side elevational views, partly in section, here depicting the sequence of operations in a typical positive displacement bonding operation embodying features of the present invention; FIG. 11a depicting the battery components to be bonded with the bonding head disposed above such components; FIG. 11b illustrating the bonding head properly located and locked in position in readiness to initiate a bonding operation; FIG. 11c illustrating the component parts of the system with the bonding ram-like electrode partially advanced into the workpieces to be bonded, and with the molten lead formed through this stage of the procedure having been displaced into surrounding relationship to the ram; FIG. 11d illustrating the component parts of the system with the ram-like electrode fully advanced into the workpieces to be bonded and with the molten lead formed having been displaced into surrounding relationship to the ram; and, FIG. 11e depicting the component parts of the system with the bonding head still in its down position but with the ram-like electrode retracted and with the molten lead having been returned to the cavity formed by the ram in the workpieces and having cooled and solidified to form a finished bond.

FIG. 12 is a vertical sectional view illustrating a modified sealing arrangement for a battery cover bushing, here illustrating the bushing and seal prior to injecting plastic material into the cover mold.

FIG. 13 is a vertical sectional view similar to FIG. 12, but here illustrating the parts after injection of plastic into the cover mold and removal of the thus molded parts from the mold.

SUMMARY OF THE INVENTION

Figure 5:
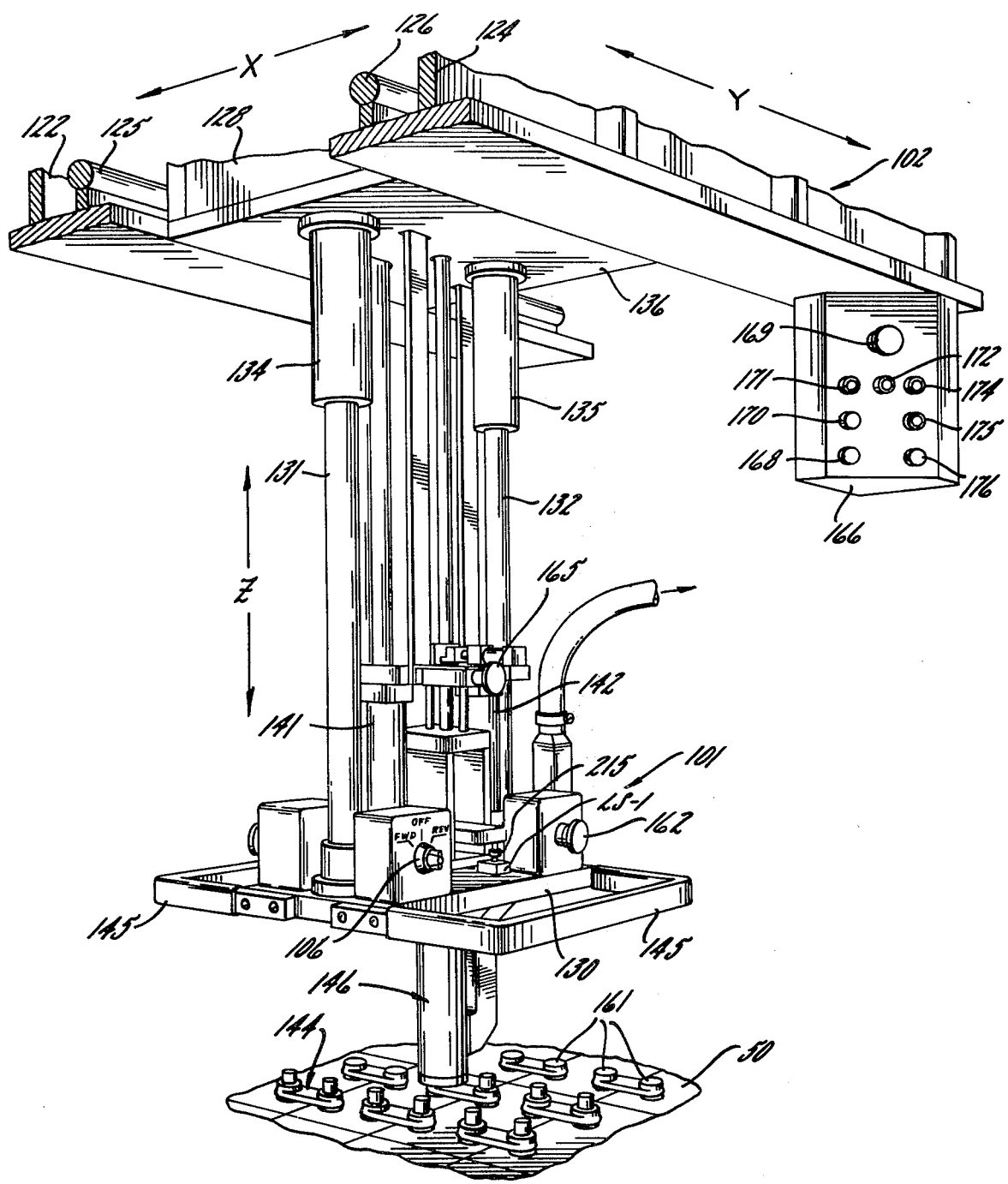
FIG. 5 is a fragmentary perspective view taken generally at right angles to the view shown in FIG. 4 and here depicting other portions of the apparatus.

The present invention pertains to methods and apparatus which are intended to overcome all of the aforementioned disadvantages and to provide a system which is capable of performing successive fusion bonding operations on a relatively high speed, mass production or assembly-line basis, yet where each bond formed is essentially devoid of flaws or imperfections and is comparable in quality to the most perfectly formed hand-burned or hand-torched bond heretofore attainable by even the most skilled personnel. To accomplish this, the present invention contemplates novel methods and apparatus wherein a heated ram-like electrode is moved co-axially through a reservoir defining means which, in the exemplary forms of the invention, comprises a co-axial barrel surrounding the electrode and defining therebetween an annular reservoir. The reservoir defining means—e.g., the barrel—is first bottomed on one of the elements to be bonded in a position co-axial with the axis of the bond to be formed. Thereafter, the ram-like electrode is moved axially through the reservoir defining means into engagement with the workpiece or workpieces to be bonded where the heat developed serves to convert the solid workpiece(s) to a molten state in the area selected for the fusion bond. Continued axial advance of the electrode serves to progressively melt the portions of the workpieces along the axis of the bond area, which axis, of course, coincides with the axis of the electrode, and the molten material thus formed is displaced by the electrode in an annular column surrounding the electrode and within the reservoir defined between the electrode and the selected reservoir defining means.

When the ram-like electrode reaches the limit of its advance movement, a limit that may be adjusted by the operator to provide for a bond of any desired depth, a short dwell period is provided to insure uniform heating of those portions of the workpieces immediately adjacent the cavity formed therein by displacement of molten material, as well as to insure uniform heating of the molten material surrounding the electrode and confined within the reservoir. Upon conclusion of such dwell period, the ram-like electrode is retracted from the workpieces and is moved axially through the reservoir defining means to a position out of contact with the molten material. As a result of such axial retraction of the electrode, the molten material is free to return to the cavity formed in the workpieces during the advance movement of the electrode, where such material is permitted to cool and solidify, thus forming a uniform fusion bond between the workpieces along the entire axis of electrode movement therethrough. Finally, the reservoir defining means—e.g., the barrel co-axial with the electrode—is retracted from its bottomed engagement with the workpieces, and the bond cycle is complete.

Because of the lower temperatures involved, it is possible with the invention to create such bonds in the immediate vicinity of other components having relatively low melting points—such, for example, as plastic motive-power battery casings—and the present invention insures a more positive seal is attained in those particular applications.

When dealing with workpieces formed of conductive metals, the activating circuit for the system is preferably from a suitable power source, through the movable electrode, through the conductive metal workpieces, through the reservoir defining means, and back to the source. The power source may be either continuous or pulsating. When dealing with non-conductive workpiece materials, the movable ram-like electrode may simply comprise or contain a suitable resistance element or the like capable of attaining and maintaining a desired temperature level sufficient to melt that portion of the workpiece material which is to be displaced and subsequently returned to effect the desired fusion bond.

While the present invention is susceptible of various modifications and alternative forms, specific embodiments thereof have been shown by way of example in the drawings and will herein be described in detail. However, it should be understood that it is not intended to limit the invention to the particular forms disclosed, but, on the contrary, the intention is to cover all modifications, equivalents and alternatives falling within the spirit and scope of the invention as expressed in the appended claims.

THE ENVIRONMENT OF THE INVENTION

As hereinabove explained, the present invention will be described herein in connection with methods and apparatus which find particular application in the industrial motive-power battery industry. Accordingly, and as best seen by reference to FIGS. 1, 2 and 3 conjointly, there have been depicted fragmentary portions of a typical industrial battery, generally indicated at 50 in FIG. 2, which is here composed of a plurality of individual battery cells 51. Such batteries may vary widely in size, configuration and electrical characteristics, and may, merely by way of example, range upwards of several feet in length, heighth and width and weigh upwards of several tons. Conversely, such batteries may be relatively small and may be capable of being transported by hand.

Referring more specifically to FIG. 1, a conventional battery cell 51 has been depicted in partially exploded form so as to expose most of the various battery components contained therein. Such components normally include a cell casing 52, commonly called a jar, and cover 54, both of which have heretofore conventionally been formed of high impact rubber. Contained within the cell casing 52 are a group of negative plates 55, a group of positive plates 56, and a group of separators 58. The negative plates 55 and positive plates 56 of the exemplary cell 51 comprise cast lead grids into which selected chemical pastes, or active materials, are inserted. Generally, a negative plate 55 may contain a paste consisting of a spongy lead material containing an expander to maintain the spongy condition, while the positive plates 56 may contain a paste consisting of lead oxide, sulfuric acid, and water mixed to a putty-like consistency. After the pastes have been applied to the respective grids, the grids are dried. The positive plates 56 are normally wrapped with fiberglass or the like (not shown) to insure retention of the active materials, and each positive plate is then inserted into a plastic protective envelope, as best indicated at 59 (FIG. 1). The separators 58 are preferably formed of microporous rubber which is temperature and acid resistant, and are generally flat on the side adjacent the negative plate and grooved on the side adjacent a positive plate. Such separators 58 serve as insulators between the interleaved positive and negative plates, although they are sufficiently porous to permit free passage of electrolyte therethrough.

After casting of the positive and negative plates, application of the active materials thereto, drying, and wrapping of the positive plates, positive and negative groups or assemblies of plates are formed, commonly by welding the lug portions 55a, 56a of the plates to battery straps and/or battery posts. As here shown, the negative plate lugs 55a are welded to a battery strap 60 integral with a pair of vertically upstanding, negative battery posts 61, while the positive plate lugs 56a are welded to a similar battery strap 62 integral with a pair of vertically upstanding positive battery posts 64. The thus assembled negative and positive plate groups are then interleaved with one another, there being a separator 58 between each positive and negative plate, and the entire assembly is inserted into the cell casing or jar 52 on top of a sediment bridge (not shown). A protective element 65, which may be made of plastic, is placed on top of the plate assembly so as to prevent: 1) foreign materials from entering the cell; 2) damage to the internal cell components by careless use of hydrometers or thermometers; and 3) moss shorts between the positive and negative plates. The high impact rubber cover 54 is then positioned on top of the jar or casing 52, with the posts 61 and 64 passing through lead bushings 66 molded in place in the cover, and the cover is secured to the jar by means of a hot, pliable, asphalt based compound. Normally at this stage of the assembly operation, the battery posts 61, 64 are bonded to the respective bushing inserts 66 by a hand-burning or hand-torching technique, electrolyte is added to the battery cell through a fill opening 68 adapted to be closed by a screw-threaded tap 69, and the cell is then repetitively charged and discharged to assure proper capacity and quality.

Once the cells 51 have been assembled, charged and inspected, they are then ready to be assembled in various configurations to provide a complete battery 50 to meet specific requirements of a customer or ultimate user. In such assembly, multiple cells are inserted into a steel battery casing 70 (FIG. 2) and interconnected in accordance with the requirements and specifications of the customer or user. Such interconnections commonly entail the use of lead intercell connectors 71 which bridge the space between battery posts of opposite polarity in adjacent cells—i.e., the positive posts of one cell are coupled to the negative posts of an adjacent cell. Referring to FIGS. 2 and 3, it will be observed that each intercell connector 71 is designed so that one end thereof sits on and surrounds a bushing 66 associated with a negative post 61, while the opposite end thereof sits on and surrounds a bushing 66 associated with a positive post 64. The workman then bonds the connector 71 to the post/bushing combination by a conventional hand-burning or hand-torching technique. Thus, referring to FIG. 2, it will be observed that the workman is utilizing a hand-burning technique in which he is holding a carbon burning tool 72 in his right hand and a rod of lead bar-stock 74 in his left hand. The arrangement is such that the carbon burning tool 72 (which could, of course, be an oxyacetylene torch) is used to melt the inner rim 75 of the opening in the connector 71 surrounding the post/bushing combination and, at the same time, to melt the exposed surface of the previously bonded post/bushing combination, with the molten lead thus formed being mixed or puddled by the hot tip of the tool 72. Additional lead is similarly melted by the tool 72 from the lower end of the supplemental lead rod 74 so as to provide sufficient molten lead to fill the entire cavity within the connector 71 defined by the edge 75 and surrounding the post/bushing combination. Indeed, the workman will commonly place a conventional mold (not shown) about the work area so as to permit the formation of a raised, button-like bond, as best indicated at 76 in FIG. 2.

It should be understood, that while it would be possible to create the aforementioned bond 76 in a single hand-burning or hand-torching operation by applying the tool 72 or torch to the assemblage of parts as shown in FIG. 3, the operation is most normally conducted in two stages—first bonding the post/bushing combination and later bonding the connector 71 to the previously bonded post/bushing combination. One reason for such two-stage bonding or torching procedure is simply that it is desirable that a permanent bond be created between the post 61 (64) and bushing 66 immediately after assembly and prior to introduction of electrolyte into the cell so as to prevent acid or other foreign materials from becoming lodged in the interface between the post and the bushing.

It will be immediately recognized by those skilled in the art that the hand-burning and/or hand-torching operations herein described have many disadvantages and are frought with dangers. Such procedures are slow, and require skilled personnel to carry them out. As lead is melted and puddled, it tends to cover the surfaces of the parts to be bonded, and extreme care must be taken to insure that all of the mating surfaces or interfaces to be bonded are uniformly heated and rendered molten—otherwise, molten lead contained within the puddle will tend to adhere to a surface which has not been raised to a sufficiently high temperature level, thereby producing an undesirable cold knit rather than a sound molecular fusion bond. Moreover, failure to obtain uniform heating and melting may result in undesirable crevices or minute passages passing through the interface of the parts being bonded, thus creating leakers and giving rise to the danger of electro-capillary pumping action at the positive post. And, of course, if extreme care is not taken, it is relatively easy to overheat the parts. When this occurs, the entire peripheral portion or rim 78 (FIG. 3) of the connector 71 may be rendered molten, permitting the puddle of lead to spill over the top of the cell, thereby destroying the connector parts and/or permitting burning of, and consequent damage to the rubber cover 54. Finally, because of the problems associated with such overheating, it has heretofore been impractical to use more economical and lightweight materials such as plastic in the formation of cell casings and/or covers for industrial motive-power batteries because such materials commonly have much lower melting points than the hard impact rubber heretofore used.

POSITIVE DISPLACEMENT CASTING IN ACCORDANCE WITH THE INVENTION

A. General Organization of Exemplary Apparatus

Referring now to FIGS. 4 through 8 inclusive, there has been illustrated an exemplary apparatus, generally indicated at 100 in FIGS. 4 – 7, for carrying out the present invention. As here shown, the exemplary apparatus 100 includes a positive displacement bonding head, generally indicated at 101, carried by an overhead suspension system, generally indicated at 102, for movement over and with respect to one or more batteries 50 carried on a pair of parallel, spaced apart, floor-mounted conveyors 104, 105. The conveyors 104, 105 may be power driven by any suitable means (not shown) and, to permit of ready control thereover, the bonding head 101 is provided with a pair of operator controls 106, 108 (best illustrated in FIGS. 4 and 5) by which the operator can activate the conveyor driving means to move a selected conveyor 104, 105 in either a forward or reverse direction, or to stop a selected conveyor in a desired location with a battery 50 disposed beneath the bonding head 101. Preferably the operator control 106 forms part of a suitable activating circuit (not shown) for conveyor 104, while control 108 forms part of an activating circuit for conveyor 105. To facilitate placement of batteries 50 on, and removal from, the conveyors, the batteries may be positioned on pallets 109 or the like which can be readily moved from place to place by conventional fork-lift trucks.

A-1. X-Oriented Movement

Figure 6:
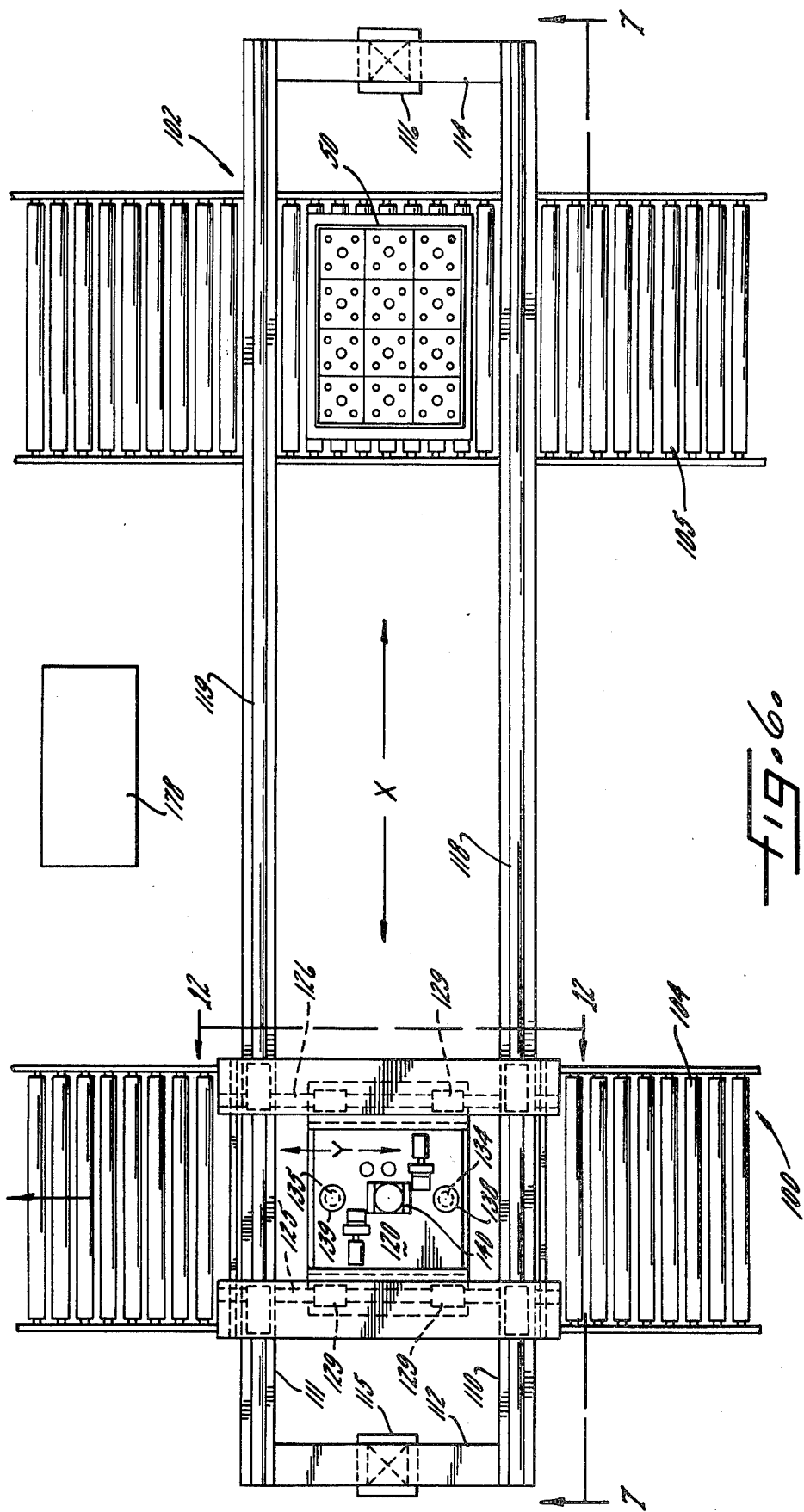
FIG. 6 is a plan view of the exemplary apparatus shown in FIG. 4, here depicting the bonding head over one conveyor belt and a battery positioned on the adjacent conveyor belt in readiness for a bonding operation.
Figure 7:
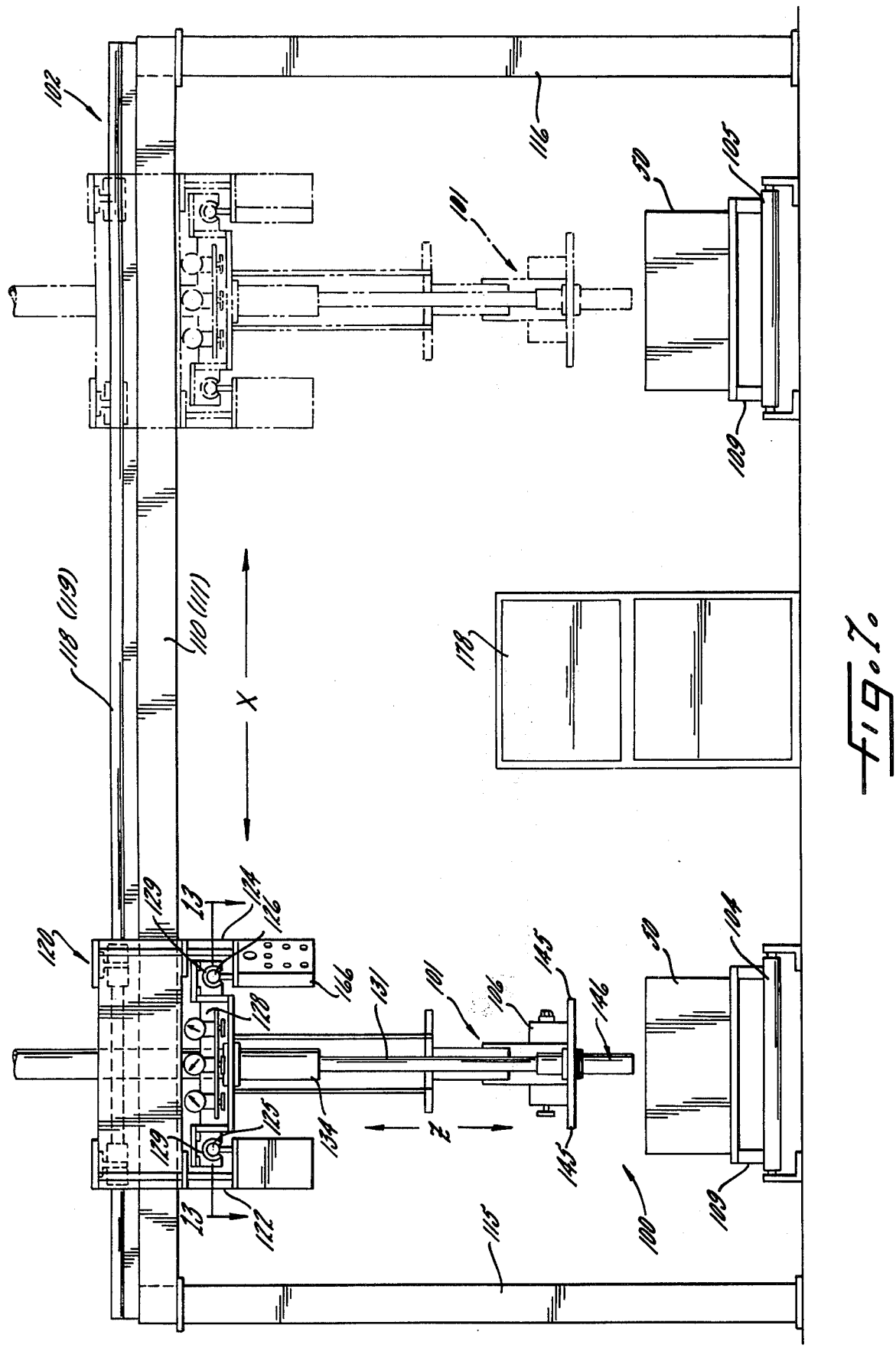
FIG. 7 is an elevational view taken substantially along the line 7—7 of FIG. 6, here depicting the bonding head in solid lines disposed over a battery carried by the left-hand conveyor and in phantom lines over a battery carried by the right-hand conveyor.

In order to permit of facile movement of the bonding head 101 over a stationary battery 50 so as to enable the formation of successive bonds at multiple battery post locations on a rapid, production-line basis, the overhead suspension system 102 is preferably designed to permit of movement of the bonding head in both an X-oriented direction (transversely of the conveyors as indicated by the arrows in FIGS. 4 – 7) and a Y-oriented direction (along the line of conveyor movement as indicated by the arrows in FIGS. 4 – 6). To accomplish this, the overhead suspension system 102 includes a pair of parallel, spaced apart beams 110, 111 (best illustrated in FIGS. 4 and 12); which extend transversely across both conveyors 104, 105 and which are connected at their opposite ends by cross beams 112, 114 (FIG. 6); the beams 110, 111, 112 and 114 defining a generally rectangular support structure (FIG. 6). Vertically disposed, upright stanchions 115 and 116 are permanently affixed at their upper ends to the cross beams 112, 114 respectively, and are mounted on the floor outboard of the conveyors 104, 105. The beams 110, 111 respectively support guide rails or tracks 118, 119 which are parallel to the beams and also extend transversely across the conveyors 104, 105. A carriage assembly, generally indicated at 120 in FIGS. 4 and 7, is provided with suitable bearing sleeves 121 (FIGS. 4 and 12) mounted in surrounding relation to the rails 118, 119, thereby permitting slidable movement of the entire carriage assembly 120 in an X-oriented direction along the rails. Suitable lubricating means (not shown) may be provided so as to minimize friction and thereby permit ease of movement of the carriage assembly 120 along the rails.

A-2. Y-Oriented Movement

For the purpose of permitting movement of the bonding head 101 in a Y-oriented direction—i.e., along the path of movement of the conveyors 104, 105—the carriage assembly 120 is provided with a pair of depending support beams 122, 124 (best illustrated in FIG. 4) which here serve to support Y-oriented tracks or guide rails 125, 126, respectively. A sub-carriage assembly, generally indicated at 128, is slidably supported on the guide rails 125, 126 by means of bearing sleeves 129. Again, suitable lubricating means (not shown) may be provided for minimizing frictional resistance between the rails 125, 126 and bearing sleeves 129 so as to permit relatively easy movement of the sub-carriage assembly 128 along the Y-oriented guide rails 125, 126.

A-3. Z-Oriented Movement

In carrying out the present invention, provision is made for enabling vertical movement of the bonding head 101 along a Z-oriented axis as viewed in FIGS. 4, 5 and 7. To this end the various operating parts of the bonding head 101 are carried by a base plate 130 which is secured to the lower ends of a pair of vertically disposed support shafts 131, 132, such shafts passing upwardly through respective ones of a pair of bearing sleeves 134, 135 rigidly secured to a plate 136 which forms the undercarriage of sub-carriage assembly 128. The upper ends of the shafts 131, 132 have enlarged collars 138, 139 (FIG. 6; best illustrated in FIG. 14) respectively affixed thereto which serve as stops engageable with plate 136 to limit downward movement of the bonding head 101.

For the purpose of permitting the bonding head 101 to float during periods between bonding cycles and during movement of the head by the operator, and to further permit automatic movement of the operating parts of the bonding head during a bonding cycle, the illustrative apparatus is provided with a series of fluid-operated, preferably pneumatic, piston/cylinder combinations 140, 141, 142, the specific functions of which are described in considerably greater detail in the aforesaid copending applications of Robert Holbrook Cushman, Ser. No. 435,157, and Raymond L. Schenk, Jr., Ser. No. 435,178. Those interested in such detailed descriptions are referred to the aforesaid copending applications. For the purpose of the present description of the general organization of parts for the exemplary apparatus, it will suffice to say that the opposite slides of the piston within piston/cylinder combination 140 are pressurized so as to balance the weight of the components carried by base plate 130 and which comprise the bonding head 101, thereby permitting the head to float at whatever height or level it is positioned in. A-4. Operator Controlled Positioning of Bonding Head The arrangement is such that when the operator wishes to move the bonding head 101 into a position in readiness to initiate a bonding cycle—for example, in readiness to bond a battery post/intercell connector combination such as generally indicated at 144 in FIGS. 4 and 5—it is merely necessary that he first activate the control 106 for conveyor 104 (or, alternatively, control 108 for conveyor 105) to generally locate a battery 50 beneath the bonding head 101. Having generally located a battery relative to the head, the operator next grasps one of the handles 145 projecting laterally from the base plate 130 and shifts the bonding head 101 laterally in either or both of an X-oriented and/or Y-oriented direction until the bonding ram assembly, generally indicated at 146 in FIGS. 4, 5 and 7, is accurately centered over the particular battery post-/intercell connector combination 144 to be bonded. The operator then needs only push downwardly on the handle 145 so as to urge the bonding head 101 and ram assembly 146 downwardly from the position shown in FIG. 7 to the position such as shown in FIGS. 4 and 5 where the particular battery post to be bonded projects co-axially upward into the bonding ram assembly 146 when the latter is bottomed on the intercell connector to be bonded. The operator is now ready to initiate a bonding cycle for the particular post/connector combination 144 located under the bonding ram assembly 146 and, when the bond is completed, the bonding head 101 will automatically move upward to the position shown in FIG. 7. The operator then again grasps the handle 145 and moves the bonding head 101 in either an X-oriented or Y-oriented direction to a position over the next post/connector combination 144 to be bonded, and again repeats the foregoing operation.

A-5. Typical Battery Post, Bushing and Intercell Connector to Be Bonded

Referring next to FIGS. 9 and 10, there have been illustrated details of a typical organization of battery components particularly suitable for bonding in accordance with the present invention. More specifically, there is depicted a battery post/intercell connector combination 144 which consists of an upstanding lead battery post 148, a lead cover bushing 149 adapted to be molded directly into a battery or cell casing 150 (which may conveniently be made of plastic, hard impact rubber, or any other suitable material), and a lead intercell connector 151. The lower end of battery post 148 is, as heretofore described, affixed to, or integral with, a battery plate strap 152 which serves to interconnect a plurality of battery plates of like polarity—either positive plates or negative plates. The arrangement in such that, when assembled prior to bonding as shown in FIG. 10, the battery post 148 passes co-axially upward through the lead bushing insert 149 and cover 150. The opposite ends of the lead intercell connector (one such end being visible in FIGS. 9 and 10) are each provided with a vertically disposed opening or passage 154 having a diameter sufficiently large to permit the connector 151 to be positioned in co-axial surrounding relation to an upstanding flange 155 formed on the bushing 151, with the lower surface of the connector in direct lead-to-lead contact with a horizontal or radial flange 156 formed on the bushing.

To insure concentricity of the parts and, at the same time, to provide for sound electrical contact therebetween, the lead battery post 148 may be provided with two or more slightly raised locating ribs or projections (one such rib having been illustrated at 158 only in FIG. 9), which ribs have a slightly larger diameter than the inside diameter of the bushing 149. However, because of the characteristic of softness inherent with lead, the battery post may be relatively easily "force-fit" into the bushing 149, and the presence of such ribs thus serves to insure good electrical contact between the post 148 and bushing 149 while, at the same time, serving to center the post within the bushing.

In keeping with the present invention, the intercell connector is provided with an upstanding peripheral collar 159 surrounding each opening 154, and a radially disposed external peripheral shoulder 160. The peripheral shoulder 160 defines the surface upon which the ram assembly 146 bottoms when the operator moves the bonding head 101 into position to effect a bond, while the upstanding collar 159 on the connector serves as a locating means to insure proper positioning of the ram assembly 146 relative to the post/connector combination 144 to be bonded and, also, the collar 159 serves as a source of lead for the bond and as a dam to confine the molten lead formed initially in the bonding operation.

In carrying out the invention, the battery post 148 is designed to provide all of the surplus lead required to effect a completed bond such, for example, as the bond shown at 161 in FIG. 5. To this end, it will be observed that the illustrative battery post 148 projects upwardly substantially above the upper surface of the connector locating collar 159 and, when the lead defining the upwardly projecting portion of the post is melted during a bonding cycle, such lead provides all of the molten material necessary to fill the annular cavity within the connector opening 154 and defined between the post 148 and connector 151. The particular height of the post 148 may vary since the amount of lead supplied will be a function of both the height and the diameter of the post 148, while the amount of lead required to form a desired bond will be a function of the size of the connector opening 154 and the desired height of the finished bond. However, it will be readily apparent to those skilled in the art upon comparison of a conventional post/bushing/connector combination such as shown in FIG. 3 with one embodying the features of the invention such as shown at 144 in FIG. 10, that the novel assemblage of parts provided by the invention will eliminate the need for any separate source of lead such, for example, as the hand-held lead bar-stock 74

(FIG. 2) which has heretofore been required in hand-burning and/or hand-torching operations.

A-6. Operator Controls

In order to facilitate an understanding of the ensuing description, the various controls that are provided for the operator and the location of such controls will be briefly described. During a normal series of bonding operations on a given battery or series of batteries, the operator will be required to handle only a few controls. These controls are, for the most part, mounted on either the bonding head 101 or on the carriage assembly 120. Thus, as best illustrated in FIG. 5, there are two operator controls mounted on the bonding head 101 in addition to the conveyor controls 106, 108 previously described. These two additional controls include a control button 162 which serves to activate a number of conventional pneumatically actuated clamps (not shown) that are mounted on the carriage assembly 120 and which serve to engage the X-oriented and Y-oriented rails 118, 119 and 125, 126 respectively, to lock the carriage assembly 120 and sub-carriage assembly 128 in position during a bonding cycle. At the same time, actuation of control button 162 serves to increase the pressure on the upper end of piston/cylinder combination 140 so as to move the electrode 164 (FIGS. 11a – 11d) contained within the ram assembly 146 downwardly into engagement with the top of a battery post 148. The second control mounted on the bonding head 101 is indicated at 165 in FIG. 5 and serves only to pressurize the bottom side of the piston/cylinder combination 140, thereby allowing the operator to rapidly move the bonding head 101 upwardly in a Z-oriented direction in the event that rapid removal of the head from the battery is required for any reason.

Depending from the carriage assembly 120 is a small control console 166 which is provided with a number of additional controls and indicator lights. These controls include a "bond initiate" button 168, actuation of which is required in order to turn bond power to the electrode 164 ON, and an "emergency stop" control 169 which may be actuated by the operator in the event of some emergency such as a broken water line, severe arcing, fire or other similar emergency which requires turning the entire system OFF quickly. Similarly, there is provided a "current abort" switch 170 which permits the operator to turn the power supplied to the electrode 164 OFF at any time he desires and for any reason. Indicator lights 171, 172, 174 and 175 serve various functions: light 171 indicates simply that a) the system is in condition for locating movement of the carriage and/or sub-carriage assemblies 120, 128 and b) the operator can move the bonding head 101 in X-, Y- and/or Z-oriented directions to locate the head relative to the next post to be bonded; light 172 indicates when the electrode 164 is locked in its down position in readiness to bond; light 174 indicates that power is ON to the electrode 164 and a bonding cycle is underway; and, light 175 is simply a fault indicating light used to indicate that some fault has been detected by the monitoring portion of the system. When such a fault is detected, the monitoring portion of the system will serve to render the system inoperative until such time as the operator ascertains what the problem is. At that time the operator can activate control button 176 which is simply a reset control that serves to clear the memory of the computers (not described in detail) and permit continued operation of the system. Once the system has been reset, the operator may take whatever steps are required to correct the fault before proceeding with the next bonding cycle. Referring to FIG. 4, it will be observed that, for the convenience of the operator, the controls 162, 165 and the small control console 166 are all duplicated on the opposite side of the equipment, thereby enabling the operator to handle the bonding head 101 from either side of the conveyor.

Figure 8:
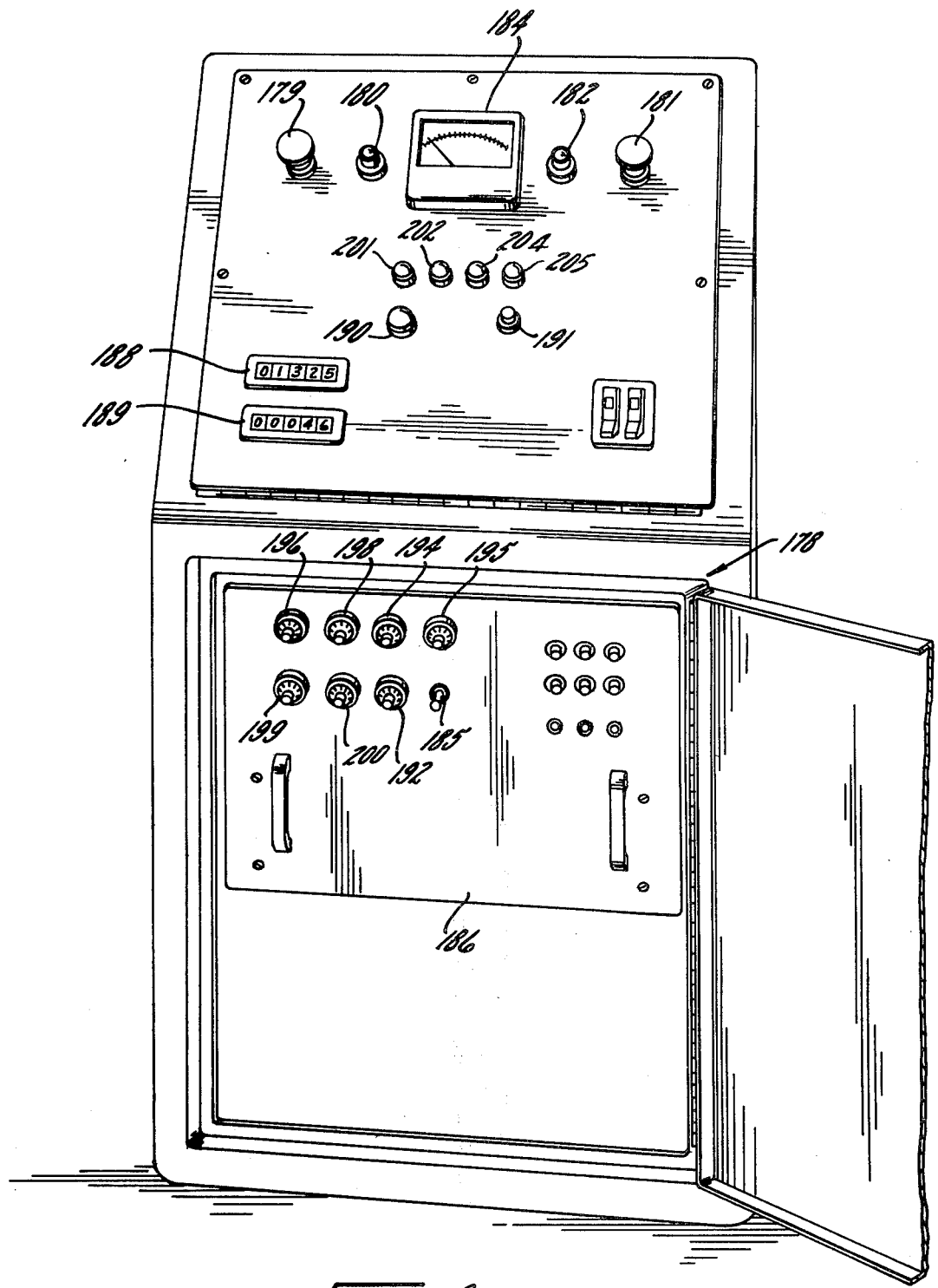
FIG. 8 is a perspective view of the front of a control console utilized with the apparatus of FIGS. 4 – 7, here depicting the console with its lower door open to expose the drawer containing certain of the electrical controls for the system.

The computer memory banks and related electronic equipment are contained within a mobile control panel and electronic console 178, best illustrated in FIG. 8. The particular electronic controls do not form an essential part of the present invention and, therefore, will not be described herein in detail. Rather, it should suffice for purposes of an overall understanding of the general organization of the apparatus and control functions available, to simply point out certain of the controls provided. Thus, the console 178 includes a power OFF switch 179 and a power ON switch 180 which includes an ON indicator light. Similarly, there is provided a bond power OFF switch 181 and bond power ON switch 182, the latter again including an indicator light. Disposed between these two sets of power switches is a conventional milliammeter 184 capable of displaying either power readings in watts or temperature, or current readings in amperes, dependent upon the position of toggle switch 185 mounted on the front of the lower console drawer 186. Conventional resettable digital display counters 188, 189 are provided for indicating, respectively, the total number of bond cycles effected by the apparatus, and the total number of bond cycles completed in a given period of time such, for example, as per shift, per day or per week. The mobile console 178 further includes a fault indicating light 190 and reset button 191 which correspond to and duplicate the controls 175, 176 shown in FIG. 5.

In order to permit presetting of the system so as to enable operation thereof within selected parameters, the mobile control console includes a number of rheostat type switches on the front of drawer 186. These include: a switch 192 for setting the amount of power to be provided to the system; a switch 194 which sets the dwell period during which the heated electrode remains heated after it reaches its maximum penetration into the bond area; a switch 195 for setting the length of the cool period during which the molten material is permitted to cool after the electrode 164 has been retracted but before the ram assembly 146 is raised; and switches 196, 198, 199 and 200 for setting such other variable parameters as the length of a bond cycle and the current setting for the electrode. These latter switches comprise part of the monitoring system and are related to indicator lights 201, 202, 204 and 205 on the console which serve to indicate when a fault condition has arisen requiring the operator to reset the system.

B. Positive Displacement Bonding— Sequence of Operations

Referring next to FIGS. 11a – 11e, there will be described a typical sequence of steps in movement of the ram assembly 146 during a positive displacement bonding operation pursuant to the present invention.

Figures 11B, 11C:
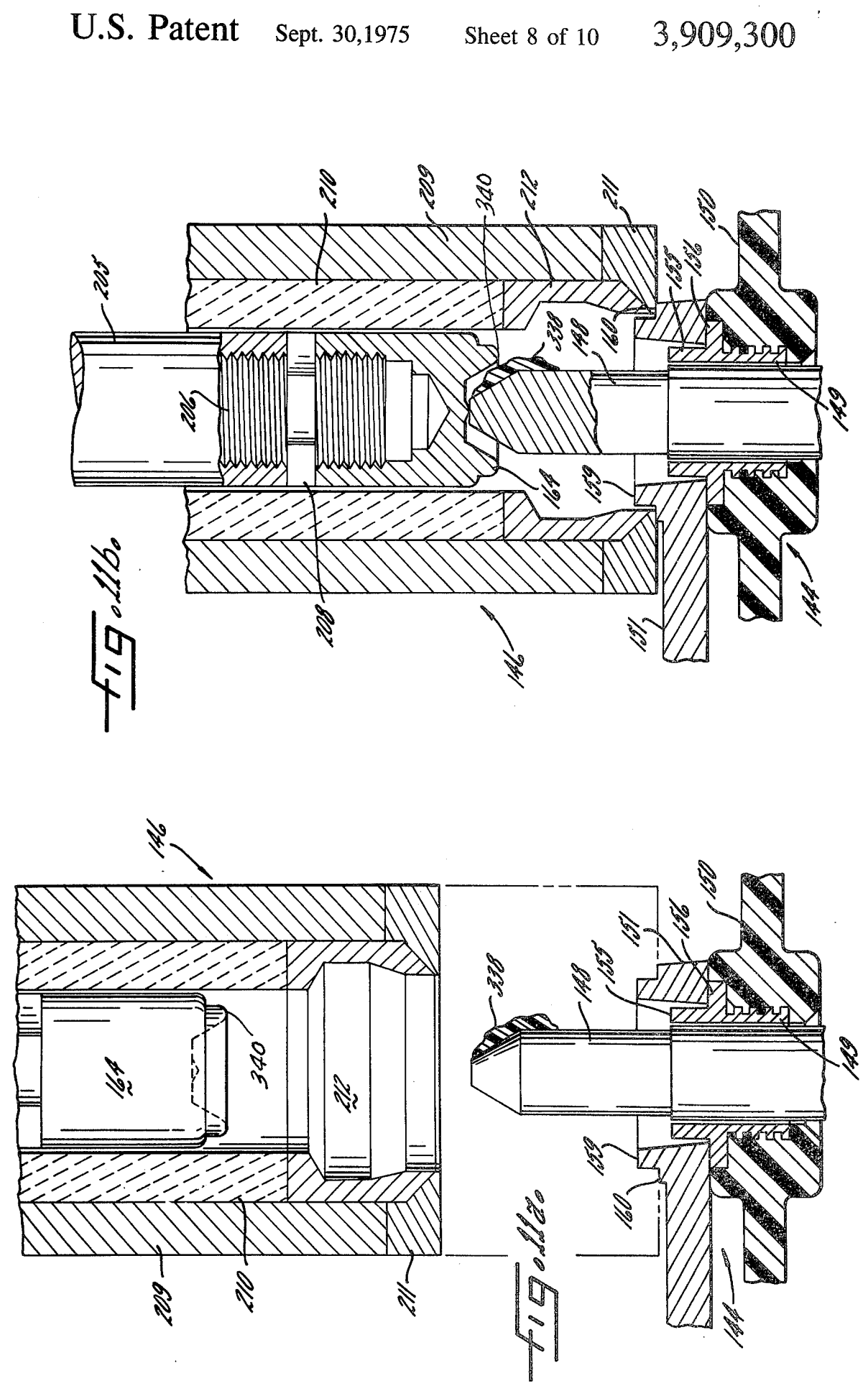

In keeping with the invention, provision is made for establishing a reservoir surrounding the area to be bonded, advancing the heated electrode 164 through the reservoir and into and through the area of the workpieces to be bonded so as to melt those portions of the workpieces to be bonded and to displace the molten material formed into the reservoir, thereby insuring accurate control of the depth of penetration into the bond area, uniform heating of the surrounding unmelted parts of the workpieces, and uniform heating of the displaced molten material contained within the reservoir, and for thereafter retracting the electrode so as to permit the displaced molten material stored in the reservoir to return to the cavity formed by the electrode in the workpieces, where the material is permitted to cool and solidify. To accomplish this, and as best illustrated in FIGS. 11a and 11b, the lower end of the ram assembly 146 includes a central ram 205 having an internal threaded bore 206 into which is threaded an adapter 208. The adapter 208 serves to removably support the electrode 164 which is threaded thereon. Preferably the ram 205 is formed of highly conductive material such as copper, while the adapter 208 and electrode 164 can be formed of various materials, some of which are hereinafter described.

In order to form a reservoir into which the molten material formed can be displaced, the lower end of the ram assembly 146 includes a barrel 209 formed of conductive material and which forms the outer member of the ram assembly. The arrangement is such that the ram 205 and electrode 164 are capable of axial movement through the barrel 209 and are insulated from the barrel by means of a ceramic liner or sleeve 210. The lower end of the barrel 209 has affixed thereto a suitable conductive locating and retaining ring 211 which can be readily removed and replaced when the need arises—for example, in the event of wear. Excellent results have been attained with the present invention by forming the locating and retaining ring 211 from a beryllium copper alloy. A suitable annular insulating collar 212, preferably made of phenolic plastic, is positioned within the lower end of the barrel 209 and ring 211 and, together with the ceramic sleeve 210, prevents direct current flow from the electrode 209 and/or ram 205 through the molten material to the barrel 210 and ring 211. The locating and retaining ring 211 serves a number of functions. Thus, the ring 211 is provided with an inwardly extending tapered radial flange that serves to retain the stacked annular insulator 212 and ceramic sleeve 210 in position. In addition, the lower surface of the ring 211 serves as a locator to facilitate in accurate positioning of the ram assembly 146 about the upright flange 159 on the connector 151. Finally, the ring serves to complete a current path from the lead parts back through the conductive barrel 209.

Referring now more specifically to FIG. 11a, it will be observed that the ram assembly 146 is shown in solid lines somewhat above the post/connector combination 144—i.e., in a position comparable to that shown in FIG. 7—and, in phantom lines in a downward position engaging the intercell connector 151—i.e., in a position comparable to that shown in FIGS. 4 and 5. Thus, it will be understood that in order to move the ram assembly 146 from the solid line position of FIG. 11a to the phantom position shown therein (at which point the electrode 164 will still be positioned well above and out of engagement with the battery post 148), it is simply necessary for the operator to press downwardly on the handle 145 (FIG. 5) of the bonding head 101 in the manner previously described, thus forcing the head down and causing the locating ring 211 to pilot about the upright flange portion 159 of the connector. However, before the operator moves the ram assembly 146 down into engagement with the connector, preferably he will apply a suitable flux 338 (FIGS. 11a and 11b) to the parts to be bonded so as to minimize the effect of oxidation. Thereafter, when the locating ring is properly positioned with respect to the connector, it will engage the radial shoulder 160 on the connector and complete an electrical connection therebetween. Because of the presence of the locating collar 159 on the connector, in the event that the ram assembly is misaligned with respect to the post/connector combination 144, the ring 211 will engage the top of the collar adn will not seat properly, a condition that will be readily apparent to the operator. In this event, the operator need only shift the bonding head 101 slightly in an X- and/or Y-oriented direction(s) until proper concentricity is achieved, at which point the opening in the ring 211 will permit further downward movement of the ram assembly until it reaches its proper downward position.

At this point in the operating cycle, the operator, having manually positioned the bonding head 101 and ram assembly 146 in proper orientation with respect to the battery post/connector combination 144 to be bonded and having observed that such proper orientation has been achieved, is now ready to initiate a bonding cycle. To this end, the operator will first engage the clamp button 162 (FIG. 5) on the bonding head, thereby serving to activate the pneumatic clamps (not shown) which will lock the carriage and sub-carriage assemblies 120, 128 in position with respect to the rails 118, 119 and 125, 126, thereby preventing further X or Y movement of the bonding head. After a short time delay, pressure will be applied to the upper end of the piston/cylinder combination 140 (FIG. 4) which will serve to move the ram 205 and electrode 164 downwardly into the position shown in FIG. 11b where the electrode 164 engages the top of the battery post 148. At this point, the indicator light 172 on control console 166 (FIG. 5) will be illuminated to indicate that the ram 205 is in position and the operator can initiate the next step of the bonding cycle.

When the operator observes that light 172 is illuminated indicating a bond ready condition, he then will engage the bond initiate button 168 which serves to complete an energizing circuit for the electrode 164. Referring to FIG. 11b, current will be supplied to the ram 205 from a suitable power source (not shown) and will be transmitted from the ram 205 through the adapter 208 to the electrode 164 which serves as a resistance element that is heated to a level sufficient to rapidly melt those portions of the lead components that it comes into engagement with. The current path passes from the electrode through the battery post 148, the lead bushing 149, the intercell connector 151, the beryllium copper locating and retaining ring 211, and back through the conductive barrel 209 to the power source.

As current begins to flow through the foregoing circuit, the electrode 164 is heated to a level sufficient to melt the lead battery post and, as a consequence, the ram 205 will start to move downwardly through the ram assembly 146 under the influence of the pressurized piston/cylinder combination 140. Referring next to FIG. 11c, it will be observed that the electrode 164 has moved downwardly a sufficient distance to melt all of the upwardly projecting portion of the battery post 148 and, at this stage of the cycle, the electrode has begun to melt the inner peripheral edge of the raised locating collar 159 on the connector. Moreover, the molten lead thus formed has been displaced laterally into an annular upstanding column as best indicated at 214 in FIG. 11c with the molten lead being disposed in the annular reservoir surrounding the electrode and defined by the insulating sleeve or collar 212 mounted within the lower end of the barrel 209. However, because of the presence of the insulating collar 212, a direct electrical path from the electrode 164 to the barrel 209 or ring 211 through the molten lead 214 is precluded.

Further downward movement of the ram 205 and electrode 164 now serves to melt the remainder of the upstanding locating collar 159 on connector 151, as well as the upper portion of flange 155 on bushing 149, thus creating a condition as best illustrated in FIG. 11d.

The system may be readily adjusted (in a manner to be hereinafter explained) to provide for penetration of the electrode 164 through the bond area to any desired and preselected depth within the workpieces. When the desired depth has been reached, a limit switch LS-1 (FIG. 5) will be actuated by means of an actuator 215 carried by the ram, and such actuation will serve to initiate a short time delay period during which the electrode 164 will dwell in its advanced position as shown in FIG. 11d with bond power ON, thereby insuring that the unmelted portions of battery post 148, bushing 149 and connector 151 are uniformly heated, and at the same time serving to insure that the molten lead 214 maintained within the reservoir is also uniformly heated. At the conclusion of the time delay period, the ram 205 and electrode 164 are retracted, while the barrel 209 of the ram assembly 146 is left in its downward position as best shown in FIG. 11e. In this position, the molten lead 214 is permitted to return to the cavity formed in the workpieces by advance movement of the electrode, and such molten material is thereafter permitted to cool and solidify during a preset cooling cycle. Upon completion of the cooling cycle, the barrel 209 of the ram assembly is retracted and the bonding cycle is complete.

C. Improved Positive Seal in a Plastic Battery Cover/Bushing Combination

It will be appreciated that the positive displacement bonding system hereinabove described permits of the rapid formation of uniform fusion bonds between the multiple lead parts of a typical intercell connector assembly in industrial motor-power batteries. Moreover, not only is the fusion bond characterized by its uniformity, but also by the fact that a considerably more uniform and lower temperature is required to form the completed bond; and, additionally, movement of the heated ram is controlled extremely closely with respect to the parts being bonded. Consequently, it is possible to now utilize lightweight plastic materials in the formation of industrial motor-power battery covers, materials which have considerably lower melting points than the hard impact rubber heretofore commonly used. The present invention deals particularly with an improved positive seal between a conventional lead bushing utilized in an industrial motor-power battery and the plastic cover which is molded about the bushing.

In accordance with this aspect of the present invention, and as best illustrated in FIG. 12, a conventional lead cover bushing 700 is provided with an annular groove 701 adjacent its lower end. A "quad-type" sealing ring 702 is positioned within the groove 701 prior to molding of a plastic cover 704 (FIG. 13) about the bushing. The bushing is then inserted in a suitable mold (not shown) and the plastic material is injected into the mold under pressure. The pressurized molten plastic material will thus act against the exposed concave section of the "quad-type" sealing ring so as to force the sealing ring to be extruded even more deeply into the groove 701 in the bushing, thus forming a complete seal between the plastic and the bushing. When the molded cover 704 and bushing are removed from the mold, the parts appear as depicted in FIG. 13. Thus, there has been provided an effective seal between the plastic cover 704 and the bushing 700 which serves to prevent seepage or creepage of electrolyte between the cover and bushing.

We claim as our invention:

1. The method of assembling an improved industrial motive-power battery comprising the steps of:
   a. positioning n (where n equals two or more) plastic battery cells in a battery casing with each cell having an assemblage of positive plates interleaved with an assemblage of negative plates and with adjacent plates of opposite polarity being spaced apart by separators, said positive plates connected to at least one upright positive post and said negative plates connected to at least one upright negative post;
   b. forming a plastic battery cover having lead bushings molded therein for receiving respective different ones of said positive and negative posts and with said lead bushings sealed with respect to said plastic battery cover by:
      b-1 forming an annular groove in the outer surface of each lead bushing;
      b-2 positioniong a continuous deformable seal element in each annular groove;
      b-3 positioning the lead bushings and seals in a plastic injection mold; and
      b-4 injecting plastic material into the mold under pressure so as to fill the mold and deform each of the seal elements into intimate sealing engagement between the molded plastic cover and the respective lead bushings;
   c. removing the molded plastic cover from the mold and positioning it on the plastic battery cell with the positive and negative posts passing upwardly through respective different ones of the lead bushings;
   d. positioning a lead intercell connector on each of said battery posts in coaxial surrounding relation thereto;
   e. positioning a bonding head having a ram and a coaxial barrel over the battery with the ram disposed on a vertical axis coinciding with the axis of one of the battery posts;
   f. moving the ram and barrel into engagement with the battery post and intercell connector, respectively;
   g. heating the ram to a temperature sufficient to convert the lead components in the path of ram movement to the molten state;

h. moving the heated ram through the barrel and axially through the battery post and intercell connector and through the upper portion of the bushing with the ram following the post downwardly as the latter melts and displacing the molten lead thus formed upwardly into the barrel in surrounding relation with the ram;

i. retracting the ram from engagement with the unmelted lead components and the molten lead;

j. returning the molten lead theretofore displaced into the barrel back to the area of ram penetration into the battery post and intercell connector where such molten lead is permitted to cool and solidify;

k. retracting the barrel from the intercell connector upon cooling and solidification of the molten lead; and, l. relocating the bonding head over each of the remaining battery posts in successive order and sequentially repeating steps f through k above for each different battery post position.

2. The method of claim 1 further characterized in that the continuous deformable seal element comprises a quad-type sealing ring.

3. An improved industrial motive-power battery having a cell and cover formed of a light-weight plastic material with a relatively low melting point formed by the method set forth in claim 1.

4. The method of assembling an improved industrial motive-power battery comprising the steps of:

a. positioning n (where n equals two or more) plastic battery cells in a battery casing with each cell having an assemblage of positive plates interleaved with an assemblage of negative plates and with adjacent plates of opposite polarity being spaced apart by separators, said positive plates connected to at least one upright positive post and said negative plates connected to at least one upright negative post;

b. forming a plastic battery cover having lead bushings molded therein for receiving respective different ones of said positive and negative posts and with said lead bushings sealed with respect to said plastic battery cover by:

b-1 forming an annular groove in the outer surface of each lead bushing;

b-2 positioning a continuous deformable seal element in each annular groove;

b-3 positioning the lead bushings and seals in a plastic injection mold; and b-4 injecting plastic material into the mold under pressure so as to fill the mold and deform each of the seal elements into intimate sealing engagement between the molded plastic cover and the respective lead bushings;

c. removing the molded plastic cover from the mold and positioning it on the plastic battery cell with the positive and negative posts passing upwardly through respective different ones of the lead bushings;

d. positioning a lead intercell connector on each of said battery posts in coaxial surrounding relation thereto;

e. positioning a bonding head over one of the battery posts;

f. heating at least a portion of said one battery post and surrounding intercell connector to the molten state and displacing the molten lead thus formed upwardly into the bonding head;

g. retracting an inner portion of the bonding head from engagement with the unmelted lead components and the molten lead to return the molten lead therefore displaced into the area of the battery post and intercell connector where such molten lead is permitted to cool and solidify;

h. retracting the bonding head from said one battery post and said surrounding intercell connector upon cooling and solidification of the molten lead; and, i. relocating the bonding head over each of the remaining battery posts in successive order and sequentially repeating steps f through h above for each different battery post position.

5. The method of claim 4 further characterized in that the continuous deformable seal element comprises a quad-type sealing ring.

6. An improved industrial motive-power battery having a cell and cover formed of a light weight plastic material with a relatively low melting point formed by the method set forth in claim 4.

7. The method of assembling an improved industrial motive-power battery comprising the steps of:

a. position n (where n equals two or more) plastic battery cells in a battery casing with each cell having an assemblage of positive plates interleaved with an assemblage of negative plates and with adjacent plates of opposite polarity being spaced apart by separators, said positive plates connected to at least one upright positive post and said negative plates connected to at least one upright negative post;

b. forming a plastic battery cover having lead bushings molded therein for receiving respective different ones of said positive and negative posts and with lead bushings sealed with respect to said plastic battery cover by:

b-1 forming an annular groove in the outer surface of each lead bushing;

b-2 positioning a continuous deformable seal element in each annular groove;

b-3 positioning the lead bushings and seals in a plastic injection mold; and b-4 injecting plastic material into the mold under pressure so as to fill the mold and deform each of the seal elements into intimate sealing engagement between the molded plastic cover and the respective lead bushings;

c. removing the molded plastic cover from the mold and positioning it on the plastic battery cell with the positive and negative posts passing upwardly through respective different ones of the lead bushings;

d. positioning a lead intercell connector on each of said battery posts in coaxial surrounding relation thereto;

e. positioning a bonding head over one of the battery posts;

f. quickly heating at least the upper portions of said one battery post and surrounding intercell connector to the molten state while shielding the plastic battery cover from the heat;

g. retracting the bonding head from said one battery post and said surrounding intercell connector upon cooling and solidification of the molten lead; and, h. relocating the bonding head over each of the remaining battery posts in successive order and sequentially repeating steps f through g above for each different battery post position.

8. The method of claim 7 further characterized in that the continuous deformable seal element comprises a quad-type sealing ring.

9. An improved industrial motive-power battery having a cell and cover formed of a light-weight plastic material with a relatively low melting point formed by the method set forth in claim 7.

* * * * *